United States Patent [19]

Blair

[11] Patent Number: 4,522,859
[45] Date of Patent: Jun. 11, 1985

[54] METHOD OF MANUFACTURE OF HONEYCOMB NOISE ATTENUATION STRUCTURE FOR HIGH TEMPERATURE APPLICATIONS

[75] Inventor: Winford Blair, La Mesa, Calif.
[73] Assignee: Rohr Industries, Inc., Chula Vista, Calif.
[21] Appl. No.: 208,015
[22] Filed: Nov. 18, 1980

Related U.S. Application Data

[63] Continuation-in-part of Ser. No. 089,177, Oct. 29, 1979.

[51] Int. Cl.³ .............................................. B23K 1/04
[52] U.S. Cl. ................................... 428/116; 181/292; 228/181; 228/194; 228/175
[58] Field of Search ............... 228/181, 193, 194, 195, 228/175; 428/116; 181/292

[56] References Cited

U.S. PATENT DOCUMENTS

| | | | |
|---|---|---|---|
| 3,479,731 | 11/1969 | Mantel et al. | 228/248 |
| 3,630,312 | 12/1971 | Woodward | 428/116 X |
| 3,656,224 | 4/1972 | Blair et al. | 228/181 |
| 3,683,488 | 8/1972 | Cook et al. | 228/181 |
| 3,690,606 | 9/1972 | Pall | 245/1 |
| 3,854,194 | 12/1974 | Woodward | 228/181 |
| 3,911,547 | 10/1975 | Vinz | 228/193 |
| 3,981,429 | 9/1976 | Parker | 228/194 |
| 4,013,210 | 3/1977 | Deminet | 228/181 X |
| 4,029,254 | 6/1977 | Blair et al. | 228/181 |
| 4,059,217 | 11/1977 | Woodward | 228/181 |
| 4,254,171 | 3/1981 | Beggs et al. | 428/116 |

Primary Examiner—Kenneth J. Ramsey
Attorney, Agent, or Firm—Patrick J. Schlesinger; Frank D. Gilliam

[57] ABSTRACT

Method of manufacturing broad band attenuation panel structure and the resulting structure therefrom for utilization in high temperature applications, having a maximum temperature in the range of 1600° F. The panel comprises a cellular core constructed of Inconel, titanium alloys, 321 stainless steel, P H hardened stainless steel and the like, positioned between and brazed, liquid interface diffusion (LID) bonded, or diffusion bonded to two facing sheets, one imperforate and one perforated, the facing sheets constructed of a similar material. A sheet of porous metal overlay made of Inconel, nickel, monel, stainless steel alloys or the like is diffusion bonded to the outer surface of the perforated facing sheet.

The sequential steps of sizing, cleaning, plating, and heating are set forth as well as the details of pressure, temperature, and protective atmosphere, and protective materials.

12 Claims, 2 Drawing Figures

METHOD OF MANUFACTURE OF HONEYCOMB NOISE ATTENUATION STRUCTURE FOR HIGH TEMPERATURE APPLICATIONS

RELATED APPLICATIONS

The present application is a continuation-in-part of (a) Ser. No. 089,177 filed on Oct. 29, 1979, of Winford Blair for Method of Manufacture of Honeycomb Noise Attenuation Structure for High Temperature Application and (b) Ser. No. 089,178 filed on Oct. 29, 1979, also of Winford Blair for Method of Manufacture of Honeycomb Noise Attenuation Structure for High Temperature Application, both of which applications have been assigned to a common assignee, Rohr Industries, Inc.

BACKGROUND OF THE INVENTION

This invention relates to a process for producing improved high temperature noise attenuation panels and more particularly to sandwich type attenuation panels utilized in a severe environment including elevated temperatures as high as 1600° F. An example of its use is for sound attenuation within the exhaust area of a modern jet aircraft engine.

In the design and manufacture of sound attenuation sandwich panels which additionally provide structural integrity in severe environments, it has been common practice to provide an attentuation sandwich panel wherein honeycomb core material is sandwiched between a perforate and imperforate sheet of thin facing material. Panels of this type of construction, although satisfactory for attenuating some specific sound frequencies, are found to be inadequate for a broad range of frequencies customarily encountered within and around modern jet engines. It has also been found that the perforations, when placed adjacent to the high speed gas and in airflow areas within aft engines, create some turbulence in those high speed flows. It has been further discovered that these panels are generally constructed with an adhesive which limits their use to low temperature environment to prevent their degradation or failure. Although a co-pending application by the assignee of the instant invention having Ser. No. 604,200 reduces and substantially eliminates this turbulence problem and the narrow frequency problem for attenuation sandwich panels in or around modern jet engines, this new concept attenuation sandwich panel cannot be used in elevated temperatures due to its adhesive bonded construction.

It should be appreciated that the environment in an aero-engine duct is very severe in that there exists a very high sound pressure level, duct dimension variations, temperature variations, boundary layer thickness variations, and a varying velocity of air flowing along the duct liner surface commonly called the grazing flow. This environment is especially severe in the exhaust area of an aero-engine where extremely high operating temperatures are encountered. The term acoustic liners is also meant to include such nacelle and engine structure as tail pipes, tail plugs, and tail cones and is not meant to be limiting.

Before the present invention, there had not been an entirely satisfactory attenuation material with structural integrity capable of withstanding severe high-temperature environment conditions, such as those encountered in exhaust areas of modern jet aircraft engines.

SUMMARY OF THE INVENTION

It is the primary object of this invention to provide a manufacturing process and the resulting structure therefrom which provides an improved attenuation sandwich material that can be utilized especially in a high temperature environment.

It is a further object of this invention to provide an attenuation sandwich structure that has the strength required to be utilized as supporting structure.

A still further object of this invention is to provide a linear attenuation sandwich material employing the Helmholtz resonant cavity sound attenuation principles.

A still further object of this invention is to provide a manufacturing method that may be used to construct a novel sound attenuation material having a predetermined flow resistance to the sound to be attenuated in the cells of the core.

And yet another object of the present invention is to provide an acoustic liner for an aero-engine duct having linear acoustic impedance to impinging sound over a wide range of frequencies.

These and other objects and advantages of the invention will become better understood by reference to the following detailed description, when considered with the drawings, in which:

DETAILED DESCRIPTION OF THE PREFERRED EMBODIMENT OF THE INVENTION

Figure 1:
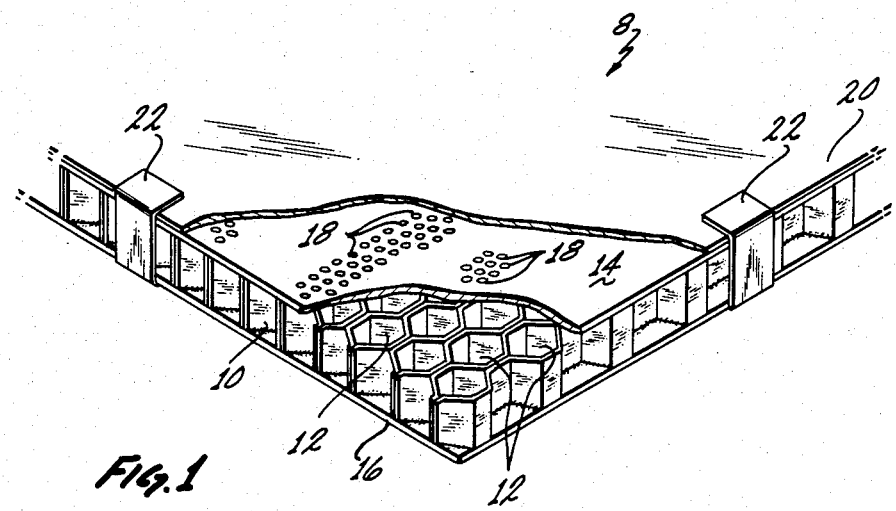
FIG. 1 is a prespective view of a completed attenuation sandwich panel constructed by the process of the instant invention.
Figure 2:
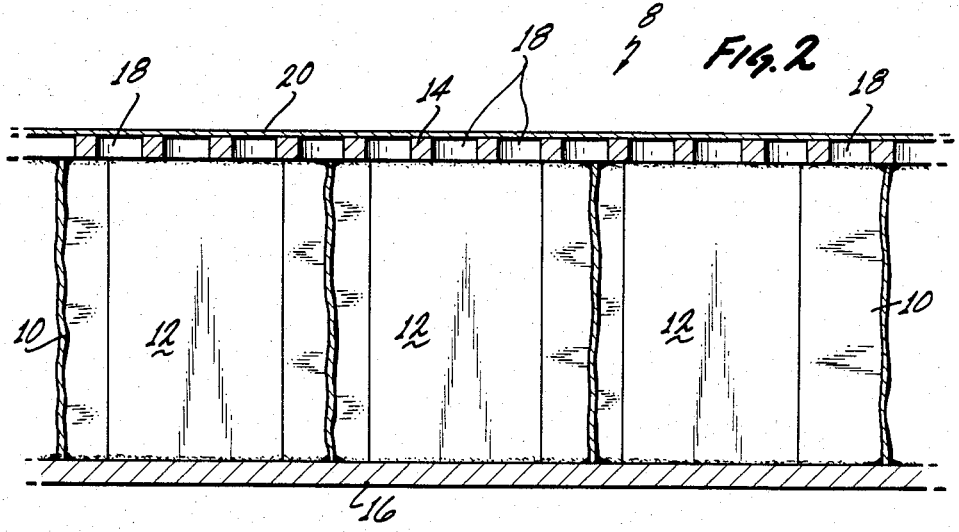
FIG. 2 is a fragmentary vertical section of the attenuation sandwich panel of FIG. 1.

Referring now specifically to FIGS. 1 and 2 in detail. The process of the invention provides an attenuation sandwich panel 8. The constituent elements of the sandwich panel include a welded honeycomb core 10 having a plurality of endwise directed cells, outer facing sheets 14 and 16, a smooth porous metal overlay 20 such as a wire cloth material having, for example, a dutch twill weave. Another example of a suitable smooth porous metal overlay is a fibrous porous metal felt material. The preferred material for the core and facing sheet for use in an environment where the temperature is in the range of 0° to 1600° F. is Inconel or other stainless steel alloys and the like. Other metals having stable temperature characteristics in the range of 1600° F. that can be diffusion bonded or brazed may be used equally as well to practice this invention. The facing sheet 14 is perforated with a plurality of small perforations 18, their size, for example, ranging from 0.050 to 0.250 inches. The perforations 18 provide a range of from 12% to 35% open area to the facing sheet 14. The perforation 18 may be punched, drilled, or chem milled through the sheet. Chem milling is desirable as the cross sectional area of the perforation can be predetermined and both surfaces of the sheet 14 remain smooth and do not require deburring, grinding, filing, etc., prior to their use. The perforations may be spaced at 0.25 inch intervals and, for example, in staggered rows. Various other spacing intervals and patterns may be used to successfully practice the invention. Sheet 16 is imperforate and forms one closed surface of each cell Helmholtz Resonator Cavity. The wire cloth 20 is preferably constructed of Inconel, nickel, monel, stainless steel alloys or other materials having like characteristics. For operational temperatures up to 800° F., a 300 series stainless steel wire cloth may be used and for operational temperatures up to 1600° F. wire cloth made of other alloys such as Inconel or DH-242 are preferably employed. As noted, the porous metal overlay 20 is very smooth and also provides an effective hole diameter of preferably less than $10^{-3}$ inches and weighs no more than 0.15 pounds per square foot. The hole size of the metal overlay 20 and the sheet 14 are obviously interdependent and are selected to provide a predetermined linear flow resistance and Rayl number over a particular frequency range to sound passing by the subject material.

METHOD OF MANUFACTURE

The sequential steps of assembling the facing sheets 14, 16, core 12, and the porous metal overlay 20 into an improved high temperature attenuation panel 8 as shown in FIG. 1 will now be described.

The components to be assembled are first sized having in mind the desired size requirement for the ultimate attenuation panel 8 or the economics of manufacture. Various known methods and means in the art may be used for sizing components such as used herein, namely, shears, friction saws or the like.

The porous metal overlay 20 is initially diffusion bonded to the perforated facing sheet 14. Diffusion bonding generally describes a solid state joining process in which no fusion of a filler metal or a base metal is involved, no deleterious foreign matter is added, and the joint is made only by self diffusion or solid state reactions of the component materials under conditions of cleanliness, temperature, and pressure. The metal to metal contact under very high pressure is essential to the process and is provided by plastic deformation of the components. After contact is made under ultraclean conditions, solid state diffusion takes place.

It is contemplated by the present invention that the porous metal overlay 20, whether it be metallic fibrous material or a woven wire cloth, would not only be diffusion bonded to the perforated facing sheet 14 but also bonded within itself as the adjacent contiguous metal fibers or metal threads are diffusion bonded to each other so that the porous metal overlay 20 and the perforated sheet 14 form an integral unit. It should be understood, however, that the porous metal overlay 20 is diffusion bonded only to the exterior surface of the perforated facing sheet 14 and that the porous metal overlay 20 does not extend down into the perforations 18 of the sheet 14.

Self diffusion bonding may be accomplished by either being yield stress controlled, that is utilizing pressures which exceed the material strength at bonding temperature or creep controlled in that extended time is required to establish metal to metal contact across the interfacial voids before atomic diffusion can begin. The yield method of plastic flow requires ultraclean surface conditions, but because of the relatively short exposure times and high pressure engagement of the parts, the bonded parts are less subject to physical property damage due to the presence of atmospheric impurities.

The slow creep controlled processes, by contrast, are critical with respect to surface cleanliness and also require a protective atmosphere or hard vacuum to prevent contamination and loss of properties. Both methods employ plastic flow of the components to be joined. The yield stress controlled method requires relatively short periods of time at temperature and therefore is a preferred method but requires high pressures and very clean conditions at temperatures in 2050° F. range. The yield stress controlled method requires machinery or tooling to apply high forces to the parts being joined while they are at a high temperature. This also requires that such machinery or tooling be devoid of contaminants. The creep controlled process requires extremely long periods of time to provide plastic flow to obtain atomic contact of the components. During the long period of time at high temperatures, the parts to be joined pick up oxygen and other contaminates making this process less desirable.

In the preferred embodiment of the invention, the aforementioned yield stress controlled process of diffusion bonding is employed. In order to achieve satisfactory diffusion bonding of the porous metal overlay 20 and the perforated sheet 14, it is necessary to establish an ultraclean condition of the overlay 20 and the sheet 14, and to employ high pressure and temperature for extended periods of time without causing a gross deformation and degradation of mechanical properties which might result from use of excessive time, temperature, or pressure.

This ultraclean condition of the porous overlay 20 and the sheet 14 is established by any suitable or well known cleaning method. An example of one preferred cleaning method is the sequential steps of vapor degreasing, soaking in an Oakite cleaning solution, Oakite being a trademarked alkaline cleaning compound manufactured by the Oakite Co., rinsing the parts in deionized water or the like, acid dipping in a nitric-hydraflouric acid in a dilute solution and a final rinse in deionized water and a thorough drying. The parts are then positioned together with opposing faces touching and are subjected to a temperature of 2050° F. for a period of 30 minutes and at a pressure of 14 psi. This would be sufficient to diffusion bond a porous metal overlay 20 composed of Inconel 600 to a facing sheet 14 composed of Inconel 625. Obviously, the times, pressures, and temperatures may be varied to insure satisfactory diffusion bonding of the parts if different materials are selected.

Although the showing of the finished product, FIG. 1, depicts the rectilinear sandwich structure 8 with all of the material on substantially parallel planes; the end product could be curvilinear by forming each component prior to assembly with this desired curvature each, of course, having substantially the same degree of curvature. As an example, and not by way of limitation, the core 12 and facing sheets 14 and 16 may comprise Inconel 625.

The skins and core are then cleaned so as to be free of any surfactants that might affect their joining by the method of this invention. Any suitable or well known cleaning methods may be utilized. An example of one preferred cleaning method is the sequential steps of vapor degreasing, soaking in a Oakite cleaning solution, Oakite is a trademark alkaline cleaning compound manufactured by Oakite Co., rinsing the components in deionized water or the like, acid dipping in nitric-hydraflouric acid in a dilute solution and a final rinse in deionized water and a thorough drying.

After sizing and cleaning, a suitable nickel (Ni) base braze alloy is applied to the cell walls 12 of the honeycomb core 10. The preferred method of braze alloy application is by spray wetting the cell surfaces 12 with an acrylic binder, such as Nicrobraz 600 cement manufactured by Wall Calmonoy, or the like, then while the binder is still wet applying the braze alloy in powder form evenly over the binder. The powdered braze alloy used may have a mesh from −140 to +270 and approximately 8 grams per square foot is used. The same process is then repeated to coat the inside walls of the core with approximately 120 grams per square foot. The edges of the core 12 are free from the binder and the braze material.

The braze alloy, for example, AMI-930 braze alloy manufactured by Alloys Metals, Inc., is sprayed on the binder coating of the core inside walls evenly by spray apparatus well known in this art to insure uniformity. An example of one such spray apparatus is fully described in the U.S. Pat. No. 3,656,224.

In connection with the bonding together of the parts, it may be desirable to use two slip sheets to preclude physical damage to the porous metal overlay 20 or to the imperforate facing sheet 16 during such procedure and to preclude any tendency of such parts to adhere to the tooling in the accomplishment of the bonding. Suitable slip sheets approximately 0.020 inch thick and having the same coefficient of thermal expansion as the face sheet 14 and the face sheet 16 with the porous metal overlay diffusion bonded to it are cut to approximately the same size as each face sheet.

The slip sheets, which are not shown for ease of illustration, after sizing are then cleaned in the same manner as prescribed for the parts of the sandwich as heretofore described in detail. A suitable stopoff material, such as Nicrobraz Orange, Wesgo, Stopyt, or such equivalent, is then applied to the opposing surfaces of the slip sheets in a layer approximately 0.002 inch thick.

The various components are now ready to be bonded. A first slip sheet is positioned upon a suitable reference brazing tool, not shown. The components of the sound attenuation structure are positioned or stacked as shown in the various figures, the solid face sheet 16 is placed on the first slip sheet, the honeycomb core 12 is positioned on the imperforate sheet 16 and the surface of the perforate sheet 14 opposing the porous metal overlay 20 is then positioned on the core 12. A second slip sheet is placed on the porous metal overlay 20 diffusion bonded to the perforate sheet 14. The stacked components are then secured in place by means of holding straps 22 which may be made from stainless steel foil or the like. These straps 22 are tack welded to each of the four vertical edges (two shown in FIG. 1) of the stacked components, preferably at twelve inch intervals around the periphery of the stack.

These stacked and secured together components are now in place upon a reference brazing tool surface constructed of graphite, ceramic, alloy steel, or the like, and are placed in vacuum furnace. A positive pressure is then applied from the outer free surface of the stacked components or toward the reference surface when the reference surface is fixed in position. A dead weight may be utilized that provides uniform pressure or Delta-Alpha tooling, tooling manufactured from material having a smaller coefficient of expansion when heated than the stacked components may be utilized when brazing conical or cylindrically shaped parts. This type of tooling is well known in the bonded or thermo plastic forming art and, therefore, needs no detailed explanation. By way of example and not by way of limitation, a flexible weight, not shown, in the form of tungsten pellets that provide a weight of approximately 200 grams per square inch, is positioned on the top of said stack so that enough pressure is applied to insure that the core 12 to face sheet interfaces are in sufficient contact for brazing.

The assembly including the reference surface is now in a vacuum furnace. The furnace is then evacuated to approximately $1 \times 10^{-5}$ torr. The interior temperature of the furnace is then elevated to the melting point of the braze alloy, which for example is around 1925° F., for approximately three minutes. When melt occurs, and the liquidus braze alloy flows along the walls of the honeycomb core, by capillary action, leaving the perforations 18 and the pores of the porous fibrous material 20 open.

The assembly is then cooled to room temperature and the braze alloy solidified, forming a unitized structure that can now be used for sound attenuation in an elevated temperature environment. The resultant unitized structure would be inspected visually and by customary x-ray or ultrasonic techniques.

Although the foregoing invention has been described in some detail by way of illustration and example for purposes of clarity of understanding, it should be understood that certain changes and modifications may be practiced within the spirit of the invention and limited only by the scope of the appended claims.

By way of example, applicant has in the companion and incorporated patent application, Ser. No. 089,177, filed Oct. 29, 1979, disclosed the manufacture of Honeycomb Noise Attenuation Structure for High Temperature Applications using the technique of liquid interface diffusion bonding to bond the components of the structure 8. Such technique would be within the scope of the present invention and is described more fully in U.S. Pat. No. 3,854,194 which is incorporated herein by reference.

Also, it would be within the scope of the present invention to join the porous metal overlay 20, the facing sheets 14 and 16 and the core 12 all by diffusion bonding. In this instance, the components would be cleaned as previously described and subjected to a high temperature in a protective atmosphere under sufficient contact to permit intimate contact of the parts for a predetermined period of time. As compared to the period of time required for liquid interface diffusion bonding, such diffusion bonding of the sandwich 10 would take place at a lesser temperature and over a longer period of time to preclude buckling of the core 12.

It would also be within the scope of the present invention to bond the sandwich comprising the perforate sheet 14, the core 12, and the perforate sheet by brazing, liquid interface diffusion bonding, or diffusion bonding in the manner heretofore set forth in detail and then thereafter to diffusion bond the porous metal overlay 20 to the perforate sheet 14 in the manner previously described.

What is claimed as new and useful and desired to be secured by United States Letters Patent is:

1. A method for manufacturing a honeycomb noise attenuation structure for a high temperature application, the structural components of said structure comprise a central honeycomb cellular core sandwiched between an imperforate and a perforate sheet with the outer surface of the perforated sheet having an overlay comprising a single layer of a porous metal, said method comprising the steps of:
   (a) sizing the structural components;
   (b) cleaning the structural components;
   (c) diffusion bonding the single layer of porous metal to one surface of the perforated sheet;

(d) wetting only the central core cell walls with a binder;

(e) applying a selected amount of a powdered braze alloy evenly over the binder coated surfaces the core edges being left free from said powdered braze alloy;

(f) stacking the imperforate sheet, honeycomb cellular core and combined perforate sheet and single layer of porous metal in assembly order;

(g) placing the stacked structural components in a vacuum furnace;

(h) applying a positive pressure to the stacked structural components;

(i) evacuating the vacuum furnace;

(j) elevating the internal temperature of the evacuated furnace to a level causing the braze alloy to melt and flow; and (k) returning the stacked components to ambient temperature.

2. The method of manufacturing as set forth in claim 1, comprising an additional step of forming the surface contour of the structural components prior to step (b).

3. The method of claim 1, wherein the porous metal overlay is a fibrous metal felt material.

4. The method of claim 1, wherein the porous metal overlay is woven metal cloth.

5. The method of claim 1, comprising the additional step of securing together the stacked components prior to step (g).

6. The method of claim 5, comprising the additional step of positioning the secured stacked components on the reference surface of a brazing tool prior to step (h).

7. The method of claim 6, comprising the additional step of placing slip sheets on the upper and lower surfaces of the stacked component sandwich.

8. The method of claim 7, comprising the additional step of coating the slip sheets with stopoff material.

9. Noise attenuation structure for use in environments having temperature ranges from 0° to 1600° F. manufactured by the method of claim 8.

10. The method of manufacturing as set forth in claim 5, wherein the securing together of the stacked components comprises attaching straps extending between the outer components of the stacked structural components and removing said straps after step (k).

11. Noise attenuation structure for use in environments having temperature ranges from 0° to 1600° F. manufactured by the method of claim 1.

12. A method for manufacturing a honeycomb noise attenuation structure for a high temperature application, the structural components of said structure comprising a central honeycomb cellular core sandwiched between an imperforate sheet and a perforate sheet, the outer surface of the perforated sheet having a layer of a porous metal overlay, said method comprising;

(a) brazing together the imperforate sheet, honeycomb cellular core and perforated sheet, and then (b) diffusion bonding the layer of porous metal overlay to the perforated sheet.

* * * * *